United States Patent
Lancioni et al.

(10) Patent No.: US 11,233,828 B1
(45) Date of Patent: Jan. 25, 2022

(54) METHODS, SYSTEMS, AND MEDIA FOR PROTECTING COMPUTER NETWORKS USING ADAPTIVE SECURITY WORKLOADS

(71) Applicant: McAfee, LLC, Santa Clara, CA (US)

(72) Inventors: German Lancioni, San Jose, CA (US); Carl D. Woodward, Campbell, CA (US)

(73) Assignee: McAfee, LLC, San Jose, CA (US)

( * ) Notice: Subject to any disclaimer, the term of this patent is extended or adjusted under 35 U.S.C. 154(b) by 280 days.

(21) Appl. No.: 16/659,204

(22) Filed: Oct. 21, 2019

(51) Int. Cl.
- *G06F 15/16* (2006.01)
- *H04L 29/06* (2006.01)
- *H04L 29/08* (2006.01)
- *H04L 12/26* (2006.01)

(52) U.S. Cl.
CPC ............ *H04L 63/20* (2013.01); *H04L 43/065* (2013.01); *H04L 63/107* (2013.01); *H04L 63/1433* (2013.01); *H04L 67/1012* (2013.01)

(58) Field of Classification Search
CPC ... H04L 63/20; H04L 63/107; H04L 63/1433; H04L 63/1012; H04L 43/065
See application file for complete search history.

(56) References Cited

U.S. PATENT DOCUMENTS

| | | | |
|---|---|---|---|
| 2014/0249835 A1* | 9/2014 | Byrom | G06Q 10/0631 705/2 |
| 2016/0044054 A1* | 2/2016 | Stiansen | H04L 63/1416 726/24 |
| 2017/0104815 A1* | 4/2017 | Tao | H04L 67/1029 |
| 2018/0013750 A1* | 1/2018 | Maurer | H04L 63/1433 |
| 2018/0321977 A1* | 11/2018 | Moore | G06F 9/5027 |
| 2019/0065524 A1* | 2/2019 | Johnson | G06F 11/10 |
| 2020/0012990 A1* | 1/2020 | Bhargava | H04L 63/20 |
| 2020/0092334 A1* | 3/2020 | Hiebert | H04L 43/0805 |
| 2020/0389432 A1* | 12/2020 | Panchalingam | H04L 63/0227 |
| 2021/0014304 A1* | 1/2021 | Tao | H04L 67/1029 |

\* cited by examiner

*Primary Examiner* — Richard G Keehn
(74) *Attorney, Agent, or Firm* — Byrne Poh LLP (57) ABSTRACT

Methods, systems, and media for protecting computer networks using adaptive workloads are provided. In some embodiments, the method comprises: transmitting, to a first server, an indication of a status of resources available to a user device; receiving a workload distribution that indicates an amount of work to be performed by the user device, wherein the amount of work is determined based on the status of resources; determining that a site is to be accessed by the user device; generating an analysis that includes one or more values indicating the safety of the site; transmitting the analysis to a second server at which a remaining amount of work is to be performed; based on the remaining amount of work, determining that the site is to be blocked from being accessed by the user device; and blocking the site from being accessed by the user device.

21 Claims, 3 Drawing Sheets

METHODS, SYSTEMS, AND MEDIA FOR PROTECTING COMPUTER NETWORKS USING ADAPTIVE SECURITY WORKLOADS

TECHNICAL FIELD

The disclosed subject matter relates to methods, systems, and media for protecting computer networks using adaptive security workloads.

BACKGROUND

Computer networks, such as a computer network associated with an organization, business, or other entity, may allow many user devices (e.g., laptop computers, mobile phones, tablet computers, desktop computers, etc.) to connect to the networks. Each connected user device can pose a security threat to a computer network. A computer network may be protected using endpoint security, where each user device connected to the computer network executes a security policy that, for example, blocks particular websites or blocks communications received from particular sites or devices. In some cases, each user device connected to a computer network may be required to implement the same security policy, without regard for performance capabilities of each user device. In some cases, this can lead to a less secure security policy being implemented on each user device connected to a computer network.

Accordingly, it is desirable to provide methods, systems, and media for protecting computer networks using adaptive security workloads.

SUMMARY

Methods, systems, and media for protecting computer networks using adaptive security workloads are provided.

In accordance with some embodiments of the disclosed subject matter, a method for protecting computer networks using adaptive workloads is provided, the method comprising: transmitting, from a user device to a first server, an indication of a status of resources available to the user device; receiving, at the user device from the first server, a workload distribution that indicates an amount of work to be performed by the device in connection with a task, wherein the amount of work is less than all of the work required to complete the task, and wherein the amount of work is determined by the first server based on the status of resources available to the device; determining that a site is to be accessed on the user device; determining that the task to be performed is evaluating a safety of the site; generating an analysis that includes one or more values indicating the safety of the site based on the amount of work indicated in the workload distribution; transmitting the analysis to a second server at which a remaining amount of work is to be performed; based on the remaining amount of work performed by the second server, determining that the site is to be blocked from being accessed by the user device; and blocking the site from being accessed by the user device.

In accordance with some embodiments of the disclosed subject matter, a system for protecting computer networks using adaptive workloads is provided, the system comprising: a memory; and a hardware processor coupled to the memory that is programmed to: transmit, from a user device to a first server, an indication of a status of resources available to the user device; receive, at the user device from the first server, a workload distribution that indicates an amount of work to be performed by the device in connection with a task, wherein the amount of work is less than all of the work required to complete the task, and wherein the amount of work is determined by the first server based on the status of resources available to the device; determine that a site is to be accessed on the user device; determine that the task to be performed is evaluating a safety of the site; generate an analysis that includes one or more values indicating the safety of the site based on the amount of work indicated in the workload distribution; transmit the analysis to a second server at which a remaining amount of work is to be performed; based on the remaining amount of work performed by the second server, determine that the site is to be blocked from being accessed by the user device; and block the site from being accessed by the user device.

In accordance with some embodiments of the disclosed subject matter, a non-transitory computer-readable medium containing computer executable instructions that, when executed by a processor, cause the processor to perform a method for protecting computer networks using adaptive workloads is provided, the method comprising: transmitting, from a user device to a first server, an indication of a status of resources available to the user device; receiving, at the user device from the first server, a workload distribution that indicates an amount of work to be performed by the device in connection with a task, wherein the amount of work is less than all of the work required to complete the task, and wherein the amount of work is determined by the first server based on the status of resources available to the device; determining that a site is to be accessed on the user device; determining that the task to be performed is evaluating a safety of the site; generating an analysis that includes one or more values indicating the safety of the site based on the amount of work indicated in the workload distribution; transmitting the analysis to a second server at which a remaining amount of work is to be performed; based on the remaining amount of work performed by the second server, determining that the site is to be blocked from being accessed by the user device; and blocking the site from being accessed by the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for protecting computer networks using adaptive security workloads are provided.

In some embodiments, the mechanisms described herein can adjust a workload distribution assigned to an elastic agent and to a cloud service, such that the elastic agent and the cloud service work in conjunction to perform security-related tasks. In some embodiments, an elastic agent can be a process or processes executing on any suitable device (e.g., a laptop computer, a desktop computer, a tablet computer, a mobile phone, a wearable computer, an Internet of Things (TOT) device, a server, and/or any other suitable device) connected to a computer network. In some embodiments, the mechanisms can adjust the workload distribution based on a status of resources of the device on which the elastic agent is executing. Each elastic agent on a network can have a different workload distribution, in some embodiments.

In some embodiments, the mechanisms described herein can cause an elastic agent to transmit an indication of a status of resources of a device on which the elastic agent is executing that are currently available to the elastic agent to perform security-related tasks. In some embodiments, the status of available resources can be received by a workload distribution service, which can determine a distribution of work that is to be allocated between the elastic agent and a cloud security service to perform security-related tasks. For example, in an instance in which a status of resources indicates relatively low resources available to an elastic agent (e.g., that the device is not currently plugged in to a power supply, that the device has a relatively low battery level, that the device is currently executing a resource-intensive application, that the device currently has a relatively low amount of available memory, that the device has a relatively poor network connection, and/or any other suitable indication of low resources), the workload distribution service can allocate a relatively low percentage of work to the elastic agent (e.g., 10%, and/or any other suitable percentage), and the remainder of the workload to a cloud service (e.g., 90%). Conversely, in an instance in which a status of resources indicates relatively more resources available to an elastic agent (e.g., that the device is currently plugged in to a power supply, that the device has a relatively high battery level, that the device is not currently executing a resource-intensive application, that the device currently has a relatively high amount of available memory, that the device has a relatively strong network connection, and/or any other suitable indication of resources), the workload distribution service can allocate a relatively high percentage of work to the elastic agent (e.g., 90%, and/or any other suitable percentage), and the remainder of the work to a cloud service (e.g., 10%). In some embodiments, if an elastic agent has access to sufficient resources, the elastic agent can perform 100% of the work required to perform the security-related tasks. Note that, in some embodiments, the workload distribution service can determine the distribution of work based on any other suitable information, such as a geographic location of the device (e.g., whether the device is currently outside of or within a particular geographic perimeter, and/or any other suitable geographic information), a current categorization of the device (e.g., whether the device has access to confidential or classified data, and/or any other suitable categorization information), and/or based on any other suitable information.

In some embodiments, the workload distribution service can then transmit the allocated workload to the elastic agent, and the elastic agent can then perform any suitable security-related tasks according to the allocated workload. For example, in an instance in which a security task to be performed by the elastic agent is to evaluate a safety of a site to be accessed by a device on which the elastic agent is executing, and in which the elastic agent has been assigned a relatively low percentage of the workload, the elastic agent can store an identifier of the site to be accessed (e.g., a URL associated with the site, and/or any other suitable identifier) and can transmit the identifier of the site to the cloud service. Conversely, in an instance in which the elastic agent has been assigned a relatively high percentage of the workload, the elastic agent can store an identifier of the site to be accessed, and can additionally perform any suitable analysis or processing of content included in the site, for example, by extracting one or more features associated with content included in the site. Continuing with this example, the elastic agent can then transmit both the identifier of the site and any extracted features to the cloud service for further evaluation.

In some embodiments, the cloud service can receive data (which can be pre-processed based on a workload distribution in some embodiments) from the elastic agent in connection with a particular security-related task (e.g., determining whether a particular site is to be allowed or blocked, determining whether communications from a particular device are to be allowed or blocked, and/or any other suitable task), and can identify a workflow for processing the data based on the amount of work assigned to the cloud service by the workload distribution service. In some embodiments, the amount of work assigned to the cloud service can be reflected by the type or the amount of data transmitted by the elastic agent to the cloud service. In some embodiments, the cloud service can then determine a result in connection with the task to be performed (e.g., that a particular site is to be blocked by the elastic agent, that a particular site is to be allowed by the elastic agent, and/or any other suitable result). In some embodiments, the cloud service can transmit the result to the elastic agent or to the device running the elastic agent (or to any other suitable device, such as a firewall), and the recipient can then perform any suitable action(s) based on the result received from the cloud service, such as blocking access to a site, allowing access to a site, and/or any other suitable action.

Note that, as described above, an elastic agent can transmit data to a cloud service. In some embodiments, the cloud service can receive the data, perform any suitable analysis in connection with the received data, and can provide a decision on an action to be taken in connection with a security-related task. For example, in an instance in which a security-related task to be performed is determining whether a particular site is to be allowed or blocked, the cloud service can determine whether the site is to be allowed or blocked based on the data provided by the elastic agent. In some embodiments, by performing less work (e.g., in response to receiving a relatively low workload distribution), the elastic agent can reduce an impact to performance of the elastic agent by performing less task-related analysis. Conversely, in instances in which an elastic agent performs more work (e.g., in response to receiving a relatively high workload distribution), the elastic agent can provide improved security to the device on which the elastic agent is executing by being able to obtain data and/or perform analyses that the cloud service cannot.

Figure 1:
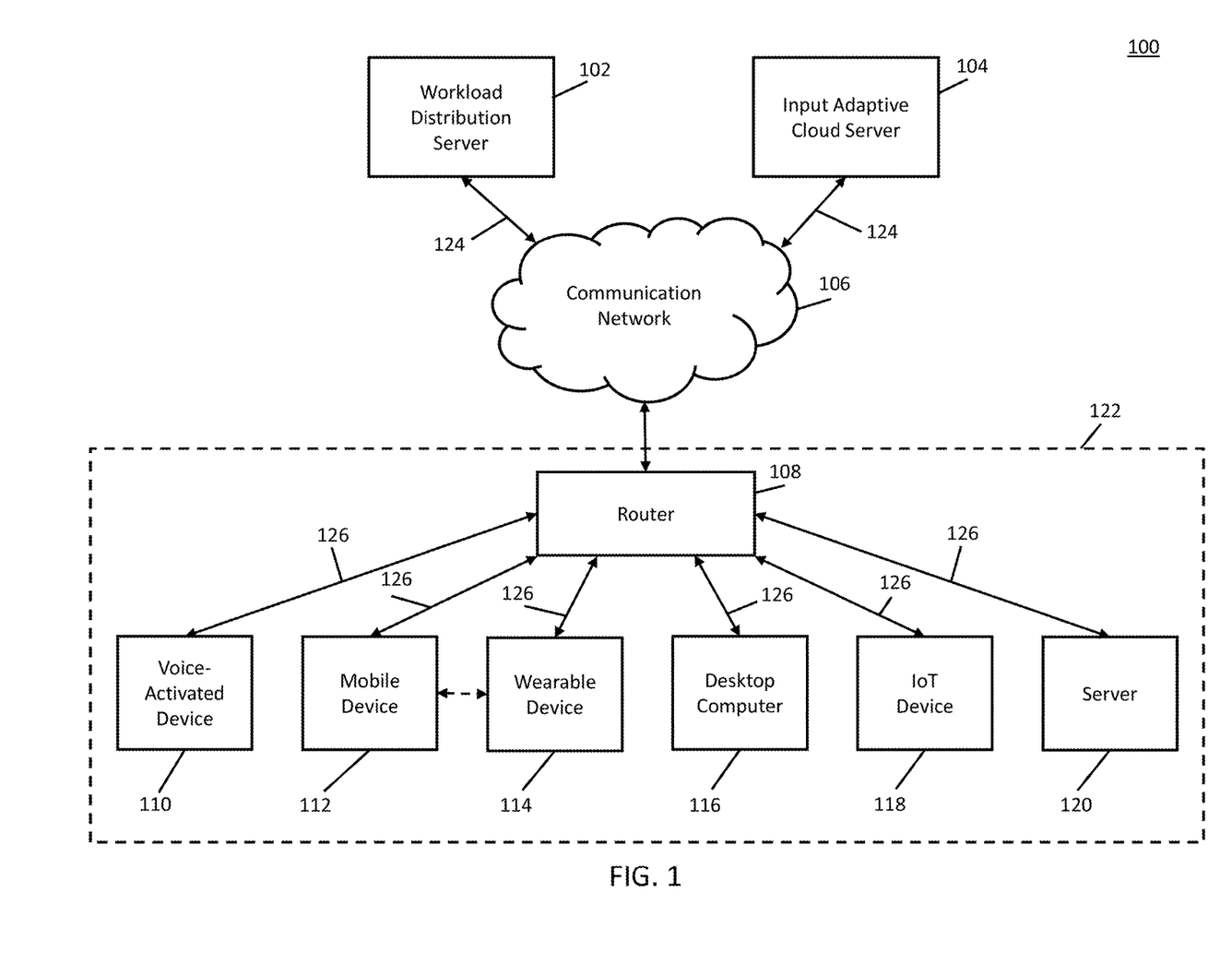
FIG. 1 shows a schematic diagram of an illustrative system suitable for implementation of mechanisms described herein for protecting computer networks using adaptive security workloads in accordance with some embodiments of the disclosed subject matter.

Turning to FIG. 1, an example 100 of hardware for protecting computer networks using adaptive security workloads that can be used in accordance with some embodiments of the disclosed subject matter is shown. As illustrated, hardware 100 can include one or more servers, such as workload distribution server 102 and/or input adaptive cloud server 104, a communication network 106, a router 108, and/or one or more protected devices 122.

In some embodiments, workload distribution server 102 can be any suitable server(s) for storing information, data, programs, and/or any other suitable content. In some embodiments, workload distribution server 102 can perform any suitable function(s), such as adjusting workloads for a particular elastic agent and cloud service combination. For example, in some embodiments, workload distribution server 102 can receive data from an elastic agent that indicates a status of resources available to the elastic agent to perform security-related tasks, determine a workload distribution based on the received data, and transmit an indication of the workload distribution to the elastic agent and/or the cloud service.

In some embodiments, input adaptive cloud server 104 can be any suitable server(s) for storing information, data, programs, and/or any other suitable content. In some embodiments, input adaptive cloud server 104 can perform any suitable function(s). For example, in some embodiments, input adaptive cloud server 104 can receive data from an elastic agent that collects security-related data (e.g., identifiers of sites to be accessed by a device on which the elastic agent is executing, features extracted from content included in sites to be accessed by the device, data associated with intercepted network packets, and/or any other suitable data), determine an action to be taken by the elastic agent based on the received data, and transmit an indication of the action to be taken to the elastic agent.

Communication network 106 can be any suitable combination of one or more wired and/or wireless networks in some embodiments. For example, communication network 106 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, protected devices 122 can be connected by one or more communications links 126 to communication network 106 via router 108. In some embodiments, communication network 106 can be linked via one or more communications links 124 to workload distribution server 102 and/or input adaptive cloud server 104. Communications links 124 and/or 126 can be any communications links suitable for communicating data among protected devices 122 and server(s) 102 and/or 104, such as network links, dial-up links, wireless links, hard-wired links, any other suitable communications links, or any suitable combination of such links.

Protected devices 122 can include any one or more devices (e.g., user devices, servers, and/or any other suitable devices) protected by security-related actions determined by input adaptive cloud server 104 and/or subject to workload allocation set by workload distribution server 102. For example, in some embodiments, protected devices 122 can include a voice-activated device 110, a mobile device 112 (e.g., a mobile computer, a tablet computer, a laptop computer, and/or any other suitable mobile device), a wearable device 114, a desktop computer 116, an IoT device 118 (e.g., a smart appliance, a smart media device, and/or any other suitable type of IoT device), and/or a server 120. In some embodiments, a protected device of protected devices 122 can execute any suitable process(es) corresponding to an elastic agent. In some embodiments, such an elastic agent can perform any suitable tasks related to security of the corresponding protected device, such as blocking or allowing access to particular sites, intercepting communications received or transmitted by the protected device, monitoring a firewall associated with the protected device, and/or performing any other suitable function(s). Note that, in some embodiments, an elastic agent of a particular protected device can perform a particular security-related task subject to a workload that is determined based on resources available to the elastic agent to perform the security-related task, such as described below in more detail in connection with FIG. 3.

Although workload distribution server 102 and input adaptive cloud server 104 are each illustrated as one device, the functions performed by workload distribution server 102 and/or input adaptive cloud server 104 can be performed using any suitable number of devices in some embodiments. For example, in some embodiments, multiple devices can be used to implement the functions performed by server(s) 102 and/or 104. As another example, in some embodiments, the functions performed by workload distribution server 102 and input adaptive cloud server 104 can be combined to be performed by one device.

Although six protected devices 110-120 are shown in FIG. 1, any suitable number of user devices, and/or any suitable types of user devices, can be used in some embodiments.

Workload distribution server 102, input adaptive cloud server 104, and protected devices 122 can be implemented using any suitable hardware in some embodiments. For example, in some embodiments, devices 102, 104, and 122 can be implemented using any suitable general-purpose computer or special-purpose computer. For example, in some embodiments, a mobile phone may be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Figure 2:
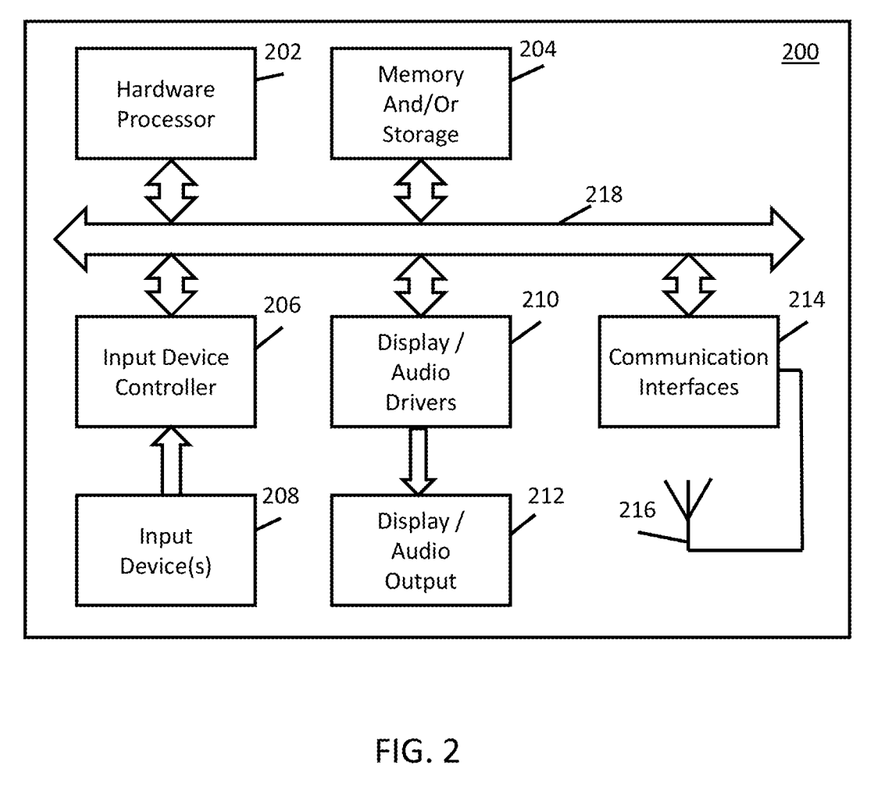
FIG. 2 shows a detailed example of hardware that can be used in a server and/or a user device of FIG. 1 in accordance with some embodiments of the disclosed subject matter.

Hardware processor 202 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 202 can be controlled by a server program stored in memory and/or storage of a server, such as workload distribution server 102 and/or input adaptive cloud server 104. In some embodiments, hardware processor 202 can be controlled by a computer program stored in memory and/or storage of a user device, such as one of protected devices 110-118.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks (e.g., computer network 106). For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 106) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
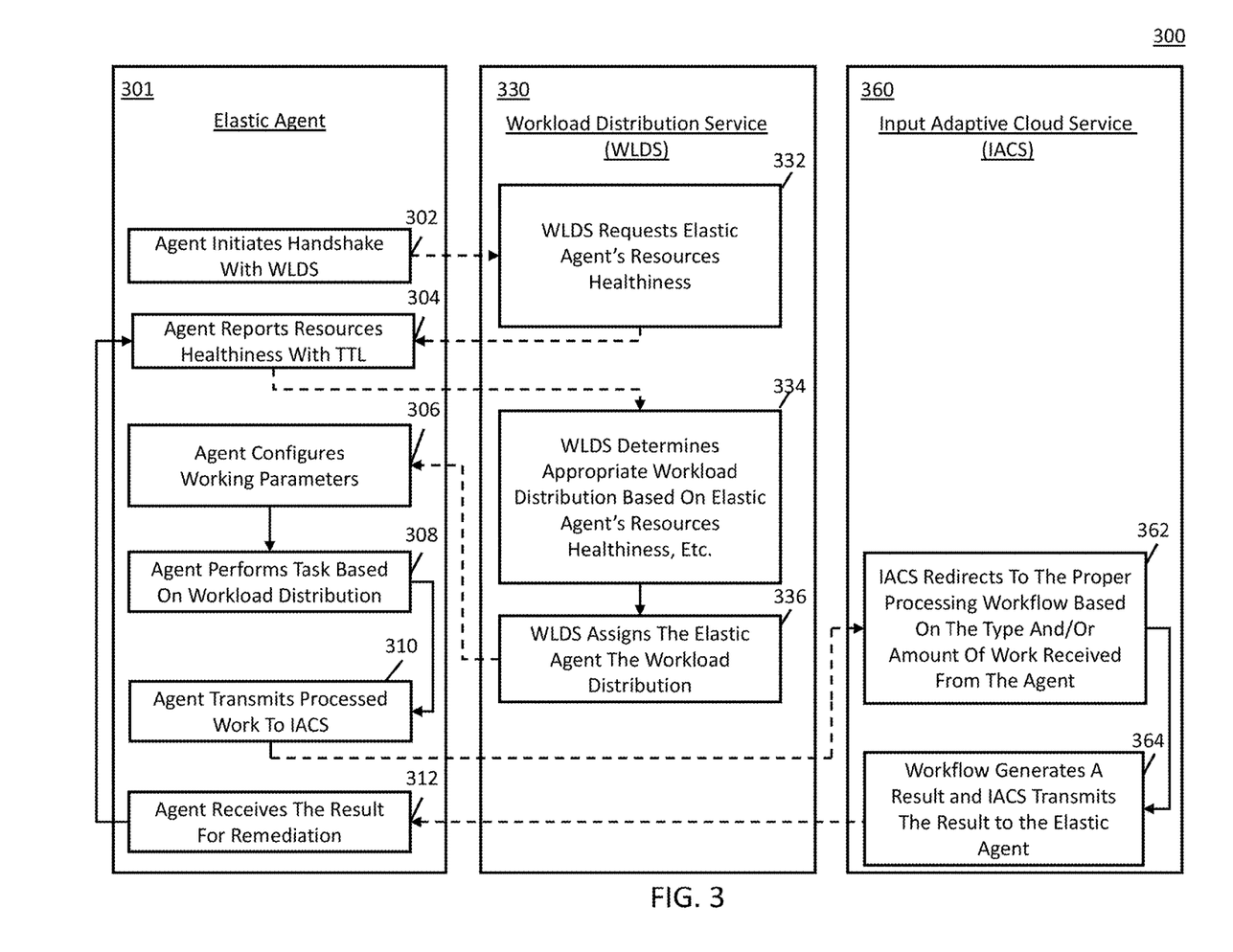
FIG. 3 shows an example of an information flow diagram for protecting computer networks using adaptive security workloads in accordance with some embodiments of the disclosed subject matter.

Turning to FIG. 3, an example 300 of an information flow diagram for protecting computer networks using adaptive security workloads is shown in accordance with some embodiments of the disclosed subject matter. As illustrated, in some embodiments, blocks of information flow diagram 300 can be implemented by an elastic agent executing process 301, a Workload Distribution Service (WLDS) executing process 330, and/or an Input Adaptive Cloud Service (IACS) executing process 360. Note that, in some embodiments, the elastic agent can be one or more process(es) executing on any suitable device (e.g., a desktop computer, a laptop computer, a mobile phone, a tablet computer, a wearable computer, an IoT device, a server, and/or any other suitable type of device) connected to a computer network, such as one of devices 110-120 as shown in and described above in connection with FIG. 1. Additionally, note that, in some embodiments, the WLDS and the IACS can be implemented by workload distribution server 102 and input adaptive cloud server 104, respectively, as shown in and described above in connection with FIG. 1.

At 302, the elastic agent can initiate a handshake with the WLDS. In some embodiments, the handshake with the WLDS can cause the elastic agent to transmit any suitable information to the WLDS, such as an identifier of the elastic agent, information associated with a device on which the elastic agent is executing (e.g., a device type associated with the device, a current location of the device, and/or an identifier of a network to which the device is currently connected), and/or any other suitable information.

Turning to process 330, at 332, the WLDS can request the elastic agent's resources healthiness. Note that, in some embodiments, an elastic agent's resources healthiness can indicate a current status of resources associated with the device on which the elastic agent is executing that are available to the elastic agent to perform security-related tasks. In some embodiments, the WLDS can request any suitable information related to resources healthiness. For example, in some embodiments, the resources healthiness can indicate a current device state of the device (e.g., whether the device is currently plugged in or running on battery, a current battery level, whether the device is relatively low in memory, whether the device is currently running other resource-intensive applications, and/or any other suitable device state). As another example, in some embodiments, the resources healthiness can indicate a state of a network connection between the device and a network to which the device is connected (e.g., a bandwidth of the connection, a strength of a wireless connection, and/or any other suitable network connection information). As yet another example, in some embodiments, the resources healthiness can indicate geographic information associated with the device (e.g., a current location of the device, whether the device is currently within a particular perimeter or other geographic region, and/or any other suitable geographic information). Additionally, in some embodiments, the WLDS can request information indicating a current categorization of the device that indicates, for example, a privacy level of data stored or accessed by the device (e.g., confidential, restricted classification, and/or any other suitable categorization), and/or any other suitable categorization information.

Referring back to process 301, at 304, the elastic agent can report the resources healthiness and/or any other suitable information (e.g., a categorization of the device executing the elastic agent, and/or any other suitable information) to the WLDS. In some embodiments, the resources healthiness can indicate a status of resources of the device on which the elastic agent is executing that are available to the elastic agent for performing any suitable security-related tasks. In some embodiments, the elastic agent can report the resources healthiness in any suitable manner. For example, in some embodiments, the elastic agent can transmit a message that includes the resources healthiness to the WLDS using any suitable protocol. Note that, in some embodiments, the elastic agent can initialize a Time To Live (TTL) of any suitable duration, and can transmit the TTL in connection with the message that includes the resources healthiness.

Turning back to process 330, at 334, the WLDS can determine an appropriate workload distribution based on the elastic agent's resources healthiness. Note that, in some embodiments, the workload distribution can indicate a percentage of a total workload associated with a particular task that is to be executed by the elastic agent and a remaining percentage of the total workload associated with the particular task that is to be executed by the IACS. For example, in an instance in which the workload distribution indicates that a relatively high percentage of a total workload is to be executed by the elastic agent (e.g., 70%, 80%, 90%, and/or any other suitable percentage) and in which a relatively low percentage of the total workload is to be executed by the IACS (e.g., 10%, 20%, 30%, and/or any other suitable percentage), the elastic agent can perform any suitable analysis tasks, and can transmit data resulting from the analysis tasks to the IACS. As a more particular example, in an instance in which a particular task corresponds to determining whether to allow or block a particular site that has been navigated to by the device on which the elastic agent is executing (e.g., a particular URL, and/or any other suitable site) and in an instance in which the workload distribution indicates that a relatively high percentage of the workload distribution is to be performed by the elastic agent, the workload distribution can indicate that the elastic agent is to capture an identifier of the site (e.g., the URL, and/or any other suitable identifier) as well as perform any suitable data extraction, processing, and/or analysis of content associated with the site, such as extracting any suitable features associated with the site content. Conversely, in an instance in which the workload distribution indicates that a relatively low percentage of the workload distribution is to be performed by the elastic agent, the workload distribution can indicate that the elastic agent is to perform relatively little of the task, for example, identifying the URL of the site.

In some embodiments, the WLDS can determine the workload distribution based on the resources healthiness that indicates a status of resources of the device on which the elastic agent is executing in any suitable manner. For example, in some embodiments, the WLDS can determine a workload distribution that, in an instance in which the elastic agent has reported that the device on which the elastic agent is executing is currently plugged in and/or has a relatively high current battery level, assigns the elastic agent to a relatively high percentage of the workload (e.g., 70%, 80%, 90%, and/or any other suitable percentage) for a particular task. Conversely, in some embodiments, the WLDS can determine a workload distribution that, in an instance in which the elastic agent has reported that the device has a relatively low battery level, assigns the elastic agent to a relatively low percentage of the workload (e.g., 10%, 20%, 30%, and/or any other suitable percentage) for a particular task. As another example, in some embodiments, the WLDS can determine a workload distribution that, in an instance in which the elastic agent has reported that the device has a relatively poor network connection (e.g., a relatively low network bandwidth, a relatively poor signal strength, and/or any other suitable network information), assigns the elastic agent to a relatively low percentage of the workload (e.g., 10%, 20%, 30%, and/or any other suitable percentage) for a particular task. Conversely, in some embodiments, the WLDS can determine a workload distribution that, in an instance in which the elastic agent has reported that the device has a relatively good network connection (e.g., a relatively high network bandwidth, a relatively strong signal strength, and/or any other suitable network information), assigns the elastic agent to a relatively high percentage of the workload (e.g., 70%, 80%, 90%, and/or any other suitable percentage) for a particular task. As yet another example, in some embodiments, the WLDS can determine a workload distribution that, in an instance in which the elastic agent has reported that the device is relatively low in memory, assigns the elastic agent to a relatively low percentage of the workload (e.g., 10%, 20%, 30%, and/or any other suitable percentage) for a particular task. Conversely, in some embodiments, the WLDS can determine a workload distribution that, in an instance in which the elastic agent has reported that the device has a relatively large amount of memory, assigns the elastic agent to a relatively high percentage of the workload (e.g., 70%, 80%, 90%, and/or any other suitable percentage) for a particular task. As still another example, in some embodiments, the WLDS can determine a workload distribution that, in an instance in which the elastic agent has reported that the device is outside of a particular geographic perimeter, assigns the elastic agent to a relatively low percentage of the workload (e.g., 10%, 20%, 30%, and/or any other suitable percentage) for a particular task. Conversely, in some embodiments, the WLDS can determine a workload distribution that, in an instance in which the elastic agent has reported that the device is within a particular geographic perimeter, assigns the elastic agent to a relatively high percentage of the workload (e.g., 70%, 80%, 90%, and/or any other suitable percentage) for a particular task.

In some embodiments, the WLDS can determine a workload distribution based on a categorization of the device on which the elastic agent is executing. For example, in an instance in which the categorization indicates that the device stores and/or accesses private and/or confidential information, the WLDS can determine a workload distribution that limits access to the IACS. As a more particular example, in some embodiments, the WLDS can determine a workload distribution that, in an instance in which the elastic agent has reported a categorization that indicates that the device stores and/or accesses private or confidential information, assigns the elastic agent to a relatively high percentage of the workload (e.g., 70%, 80%, 90%, and/or any other suitable percentage) for a particular task. In some embodiments, the WLDS can determine a workload distribution based on the categorization of the device on which the elastic agent is executing and information relating to a network connection of the device. For example, in some embodiments, the WLDS can determine a workload distribution that, in an instance in which the elastic agent has reported a categorization that indicates that the device stores and/or accesses private or confidential information, and in an instance in which the elastic agent has indicated that the device has a relatively poor network connection (e.g., that the network connection has a relatively low bandwidth, that the network connection has a relatively low signal strength, and/or any other suitable poor connection), assigns the elastic agent to a relatively high percentage of the workload (e.g., 70%, 80%, 90%, and/or any other suitable percentage) for a particular task. As another example, in some embodiments, the WLDS can determine a workload distribution that, in an instance in which the elastic agent has reported a categorization that indicates that the device stores and/or accesses private or confidential information, and in an instance in which the elastic agent has indicated that the device is not connected to a Virtual Private Network (VPN), assigns the elastic agent to a relatively high percentage of the workload (e.g., 70%, 80%, 90%, and/or any other suitable percentage) for a particular task.

Note that, in some embodiments, the WLDS can determine a workload distribution based on any suitable combination of factors (e.g., current battery level, network connection, current memory state, geographic location, categorization of the device, and/or any other suitable factors). In some embodiments, the WLDS can determine the workload distribution based on a combination of factors in any suitable manner. For example, in some embodiments, the WLDS can assign a score to each factor, and can combine the scores associated with each factor to determine the workload distribution. In some such embodiments, the WLDS can combine the scores associated with each factor in any suitable manner, such as a weighted average of scores, and/or in any other suitable manner. In some embodiments, an elastic agent can be assigned to perform all (100%) of the work associated with security-related tasks.

At 336, the WLDS can assign the elastic agent the workload distribution. In some embodiments, the WLDS can assign the workload distribution to the elastic agent in any suitable manner. For example, in some embodiments, the WLDS can transmit an indication of the workload distribution to the elastic agent in any suitable manner. Note that, in some embodiments, the WLDS can initiate a TTL that indicates a duration of time the workload distribution is valid and can transmit the TTL in connection with a message that indicates the workload distribution.

Note that, in some embodiments, the transmitted message can include any suitable instructions associated with the workload distribution. For example, in some embodiments, the message can indicate particular sub-tasks that are to be performed by the elastic agent for different tasks when the elastic agent is operating at the indicated workload distribution. As a more particular example, in an instance in which the workload distribution indicates that the elastic agent is to perform a relatively high percentage (e.g., 70%, 80%, 90%, and/or any other suitable percentage) of the workload for a task of evaluating sites to be accessed, the message can include instructions that specify that the elastic agent is to perform any suitable group of sub-tasks, such as storing an identifier of the accessed site (e.g., a URL, and/or any other suitable identifier), extracting any suitable features associated with content included in the site (e.g., features related to a likelihood that the site includes any particular types of content, such as videos, an interface for downloading files from the site, one or more forms that collect information, and/or any other suitable types of content), and/or any other suitable sub-tasks. As another more particular example, in an instance in which the workload distribution indicates that the elastic agent is to perform a relatively low percentage (e.g., 10%, 20%, 30%, and/or any other suitable percentage) of the workload for a task of evaluating sites to be accessed, the message can include instructions that specify that the elastic agent is to perform relatively fewer sub-tasks, such as storing an identifier of the accessed site for transmitting to the IACS for evaluation by the IACS. Note that, in some embodiments, sub-tasks corresponding to any suitable number of tasks can be included in the message.

Referring back to process 301, at 306, the elastic agent can receive the message and can configure working parameters based on the workload distribution.

At 308, the elastic agent can perform tasks based on the workload distribution indicated in the working parameters. In some embodiments, the elastic agent can perform any suitable tasks. For example, in an instance in which a user of the device on which the elastic agent is executing navigates to a particular site, the elastic agent can perform a task of evaluating a safety of the site subject to the workload distribution. As a more particular example, in an instance in which the workload distribution indicates that the elastic agent is to perform a relatively low workload (e.g., 10%, 20%, 30%, and/or any other suitable percentage), the elastic agent can store an identifier of the site. As another more particular example, in an instance in which the workload distribution indicates that the elastic agent is to perform a relatively high workload (e.g., 70%, 80%, 90%, and/or any other suitable percentage), the elastic agent can store an identifier of the site, and can additionally perform any other suitable sub-tasks, such as extracting one or more features of content included in the site, determining a likelihood that the site includes particular types of content, and/or any other suitable sub-tasks. Note that, in instances in which the elastic agent extracts features associated with content of a particular site, the elastic agent can extract the features in any suitable manner and using any suitable technique(s). For example, in some embodiments, the elastic agent can extract features included in HTML content associated with the site.

Note that, in some embodiments, any suitable data collected or generated by the elastic agent during performance of the task(s) (e.g., an identifier of a site to be accessed by the elastic agent, features extracted from content included in a site to be accessed by the elastic agent, and/or any other suitable data) can be referred to herein as processed work.

At 310, the elastic agent can transmit the processed work to the IACS. Note that, in some embodiments, a type and/or an amount of processed work transmitted by the elastic agent to the IACS can depend on the assigned workload distribution. For example, in an instance in which the elastic agent is assigned a relatively low workload distribution (e.g., 10%, 20%, 30%, and/or any other suitable percentage), the effort put into generating the processed work can be relatively low. As a more particular example, in some embodiments, in an instance in which a task corresponds to evaluating a safety of accessing a particular site, the elastic agent can transmit an identifier of the site. As another example, in an instance in which the elastic agent is assigned a relatively high workload distribution (e.g., 70%, 80%, 90%, and/or any other suitable percentage), the effort put into generating the processed work can be relatively larger. As a more particular example, in some embodiments, in an instance in which a task corresponds to evaluating a safety of accessing a particular site, the elastic agent can transmit an identifier of the site, as well as the results of any processing or analysis the elastic agent has performed related to content of the site, such as extracted features relating to content of the site, a likelihood that the site includes particular types of content, and/or any other suitable analysis.

Turning to process 360, at 362, the IACS can receive the processed work and can redirect to a particular workflow based on a type and/or an amount of the processed work received from the elastic agent. In some embodiments, the IACS can identify the workflow and redirect to the identified workflow in any suitable manner. For example, in some embodiments, the processed work can be transmitted by the elastic agent to the IACS using overloaded methods (e.g., overloaded REST APIs, and/or any other suitable overloaded functions or methods), where each function or method of the overloaded methods includes a different number of input parameters, each corresponding to different processed work or data transmitted by the elastic agent to the IACS at 310. As a more particular example, in an instance in which a task is evaluating a safety of a particular site to be accessed by the device on which the elastic agent is executing, the processed work can be received by the IACS using a group of overloaded methods, such as: {EvaluateSiteSafety(URL); and EvaluateSiteSafety(URL, features)}. Continuing with this example, in an instance in which the elastic agent has been assigned a relatively low workload distribution and therefore has transmitted a URL indicating an identifier of the site to be accessed without transmitting any extracted features or other analysis, the IACS can receive the transmitted URL, and can determine (e.g., determine based on only one parameter being transmitted from the elastic agent) that a workflow corresponding to the first method in the group of overloaded methods (e.g., EvaluateSiteSafety(URL)) is to be used. Conversely, in an instance in which the elastic agent has been assigned a relatively high workload distribution and therefore has transmitted a URL indicating an identifier of the site to be accessed as well as extracted features associated with content of the site, the IACS can receive the transmitted URL and the extracted features, and can determine (e.g., determine based on multiple parameters being transmitted from the elastic agent) that a workflow corresponding to the second method in the group of overloaded methods (e.g., EvaluateSiteSafety(URL, features)) is to be used.

Note that, although block 362 describes the IACS as identifying a workflow based on a type and/or an amount of processed work received from the elastic agent, where the identified workflow corresponds to an amount of work to be performed by the IACS, in some embodiments, the IACS can identify the workflow based on an explicit work distribution assignment received by the IACS from the WLDS. For example, in some embodiments, the elastic agent can transmit an indication (e.g., prior to 308 of process 301) to the WLDS that indicates a task to be performed, such as determining whether to allow or block access to a particular site. Continuing with this example, in some embodiments, the WLDS can transmit an indication of the workload distribution to both the elastic agent and the IACS (e.g., such as described above in connection with 336) that indicates a percentage of the workload for the task to be performed that is to be performed by each of the elastic agent and the IACS. In some such embodiments, the IACS can then identify a workflow corresponding to the percentage of the workload distribution specified by the WLDS at 362.

At 364, the workflow used by the IACS can generate a result based on the processed work transmitted by the elastic agent and the IACS can transmit the result to the elastic agent. In some embodiments, the workflow can generate any suitable result related to any suitable task. For example, in the example given above in which a task to be completed is evaluating a safety of a site to be accessed, the workflow can generate a result indicating a safety of the site (e.g., that access to the site is to be allowed, that access to the site is to be blocked, and/or any other suitable result). Note that, in some embodiments, the workflow used by the IACS, selected based on the amount and type of processed work transmitted by the elastic agent, can determine the result based on the processed work transmitted by the elastic agent. For example, in an instance in which the elastic agent transmitted an identifier of a site to be accessed without transmitting any extracted features or other analysis of content of the site, the workflow (e.g., EvaluateSiteSafety (URL), such as described above in connection with 362), can perform any suitable techniques using the URL transmitted by the elastic agent. As a more particular example, in some embodiments, the workflow can query any suitable database or service (e.g., a database associated with the IACS, an external database or service, and/or any other suitable database or service) that indicates a reputation associated with the URL. As another example, in an instance in which the elastic agent transmitted an identifier of a site to be accessed in connection with one or more extracted features associated with content included in the site, the workflow (e.g., EvaluateSiteSafety(URL, features), such as described above in connection with 362), can perform any suitable techniques using the URL and the extracted features. As a more particular example, in some embodiments, the workflow can use the extracted features as an input to any suitable trained classifier that produces an output indicating a likelihood that the site is safe to access.

Referring back to process 301, at 312, the elastic agent can receive the result transmitted by the IACS for remediation. In some embodiments, the elastic agent can perform any suitable action in response to receiving the result transmitted by the IACS. For example, in an instance in which the task to be performed is determining a safety of a site to be accessed by the device on which the elastic agent is executing, in response to receiving a result from the IACS that indicates that the site is unsafe and/or is to be blocked, the elastic agent can block access to the site (e.g., by inhibiting navigation to a URL associated with the site, and/or in any other suitable manner). Conversely, in response to receiving a result from the IACS that indicates that the site is safe to be accessed, the elastic agent can allow access to the site by allowing navigation to the site.

In some embodiments, the elastic agent can then loop back to 304 and can report an updated resources healthiness to the WLDS. Note that, in some embodiments, the elastic agent can be configured to report the resources healthiness to the WLDS at any suitable time(s). For example, in some embodiments, the elastic agent can be configured to report the resources healthiness to the WLDS at a time at which the WLDS indicated the workload distribution would expire (e.g., a TTL transmitted in connection with the assigned workload distribution, such as described above in connection with 336). As another example, in some embodiments, the elastic agent can be configured to report the resources healthiness to the WLDS at any suitable frequency (e.g., once per hour, once per two hours, and/or any other suitable frequency). Additionally or alternatively, in some embodiments, the elastic agent can be configured to report the resources healthiness to the WLDS in response to determining that any suitable state associated with the device on which the elastic agent is executing has changed (e.g., the device has been plugged into a power supply or unplugged from a power supply, the battery level of the device has dropped below a predetermined threshold or risen above a predetermined threshold, an amount of available memory has dropped below a predetermined threshold or has risen above a predetermined threshold, the device has moved to a different geographic location, the device has entered or left a particular geographic perimeter, a bandwidth of a network connection of the device to a communication network has dropped below a predetermined threshold or has risen above a predetermined threshold, a categorization of the device has changed, and/or any other suitable status change of the device).

In some embodiments, at least some of the above described blocks of the processes of FIG. 3 can be executed or performed in any order or sequence not limited to the order and sequence shown in and described in connection with the figure. Also, some of the above blocks of FIG. 3 can be executed or performed substantially simultaneously where appropriate or in parallel to reduce latency and processing times. Additionally or alternatively, some of the above described blocks of the processes of FIG. 3 can be omitted. For example, in some instances of some embodiments, the elastic agent can perform 100% of the work related to security-related tasks. In such cases, blocks 310, 312, 362, and 364 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for protecting computer networks using adaptive security workloads are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for protecting computer networks using adaptive security workloads, comprising:
    transmitting, from a user device to a first server, an indication of a status of resources available to the user device;
    receiving, at the user device from the first server, a workload distribution that indicates an amount of work to be performed by the device in connection with a task, wherein the amount of work is less than all of the work required to complete the task, and wherein the amount of work is determined by the first server based on the status of resources available to the device;
    determining that a site is to be accessed on the user device;
    determining that the task to be performed is evaluating a safety of the site;
    generating an analysis that includes one or more values indicating the safety of the site based on the amount of work indicated in the workload distribution;
    transmitting the analysis to a second server at which a remaining amount of work is to be performed;
    based on the remaining amount of work performed by the second server, determining that the site is to be blocked from being accessed by the user device; and
    blocking the site from being accessed by the user device.

2. The method of claim 1, wherein the status of resources includes an indication of a quality of a network connection of the user device to a communication network.

3. The method of claim 1, wherein the status of resources includes whether the user device is plugged in to a power supply.

4. The method of claim 1, wherein the status of resources includes a battery level of the user device.

5. The method of claim 1, further comprising:
    detecting that a status of resources at the user device has changed;
    in response to detecting that the status of resources has changed, transmitting, from the user device to the first server, an updated indication of the status of resources; and
    receiving, at the user device from the first server, an updated workload distribution that indicates an updated amount of work to be performed by the user device in connection with the task, wherein the updated amount of work is different than the amount of work.

6. The method of claim 1, wherein the one or more values includes an identifier of the site to be accessed.

7. The method of claim 1, wherein the one or more values include features corresponding to content of the site to be accessed.

8. A system for protecting computer networks using adaptive security workloads, the system comprising:
    a memory; and
    a hardware processor coupled to the memory that is programmed to:
        transmit, from a user device to a first server, an indication of a status of resources available to the user device;
        receive, at the user device from the first server, a workload distribution that indicates an amount of work to be performed by the device in connection with a task, wherein the amount of work is less than all of the work required to complete the task, and wherein the amount of work is determined by the first server based on the status of resources available to the device;
        determine that a site is to be accessed on the user device;
        determine that the task to be performed is evaluating a safety of the site;
        generate an analysis that includes one or more values indicating the safety of the site based on the amount of work indicated in the workload distribution;
        transmit the analysis to a second server at which a remaining amount of work is to be performed;
        based on the remaining amount of work performed by the second server, determine that the site is to be blocked from being accessed by the user device; and
        block the site from being accessed by the user device.

9. The system of claim 8, wherein the status of resources includes an indication of a quality of a network connection of the user device to a communication network.

10. The system of claim 8, wherein the status of resources includes whether the user device is plugged in to a power supply.

11. The system of claim 8, wherein the status of resources includes a battery level of the user device.

12. The system of claim 8, wherein the hardware processor is further programmed to:
    detect that a status of resources at the user device has changed;
    in response to detecting that the status of resources has changed, transmit, from the user device to the first server, an updated indication of the status of resources; and
    receive, at the user device from the first server, an updated workload distribution that indicates an updated amount of work to be performed by the user device in connection with the task, wherein the updated amount of work is different than the amount of work.

13. The system of claim 8, wherein the one or more values includes an identifier of the site to be accessed.

14. The system of claim 8, wherein the one or more values include features corresponding to content of the site to be accessed.

15. A non-transitory computer-readable medium containing computer executable instructions that, when executed by a processor, cause the processor to perform a method for protecting computer networks using adaptive security workloads, the method comprising:
    transmitting, from a user device to a first server, an indication of a status of resources available to the user device;
    receiving, at the user device from the first server, a workload distribution that indicates an amount of work to be performed by the device in connection with a task, wherein the amount of work is less than all of the work required to complete the task, and wherein the amount of work is determined by the first server based on the status of resources available to the device;
    determining that a site is to be accessed on the user device;
    determining that the task to be performed is evaluating a safety of the site;
    generating an analysis that includes one or more values indicating the safety of the site based on the amount of work indicated in the workload distribution;

transmitting the analysis to a second server at which a remaining amount of work is to be performed;

based on the remaining amount of work performed by the second server, determining that the site is to be blocked from being accessed by the user device; and blocking the site from being accessed by the user device.

16. The non-transitory computer-readable medium of claim 15, wherein the status of resources includes an indication of a quality of a network connection of the user device to a communication network.

17. The non-transitory computer-readable medium of claim 15, wherein the status of resources includes whether the user device is plugged in to a power supply.

18. The non-transitory computer-readable medium of claim 15, wherein the status of resources includes a battery level of the user device.

19. The non-transitory computer-readable medium of claim 15, wherein the method further comprises:

detecting that a status of resources at the user device has changed;

in response to detecting that the status of resources has changed, transmitting, from the user device to the first server, an updated indication of the status of resources; and receiving, at the user device from the first server, an updated workload distribution that indicates an updated amount of work to be performed by the user device in connection with the task, wherein the updated amount of work is different than the amount of work.

20. The non-transitory computer-readable medium of claim 15, wherein the one or more values includes an identifier of the site to be accessed.

21. The non-transitory computer-readable medium of claim 15, wherein the one or more values include features corresponding to content of the site to be accessed.

* * * * *